April 28, 1964     H. H. BALLARD     3,130,516
FISHING TACKLE

Filed Nov. 2, 1962     2 Sheets-Sheet 1

INVENTOR:
HORI H. BALLARD
BY
ATTORNEYS

April 28, 1964  H. H. BALLARD  3,130,516
FISHING TACKLE
Filed Nov. 2, 1962  2 Sheets-Sheet 2
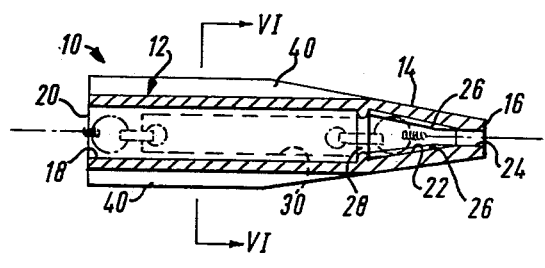
— FIG. 5. —
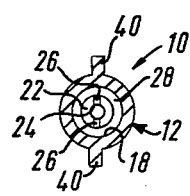
— FIG. 6. —
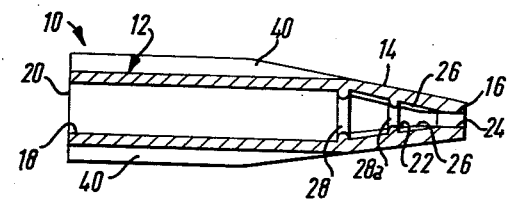
— FIG. 7. —
INVENTOR:
HORI H. BALLARD
BY
ATTORNEYS United States Patent Office 3,130,516
Patented Apr. 28, 1964

3,130,516
FISHING TACKLE
Hori Hale Ballard, Liverpool, England, assignor to Hori Ballard Limited, Liverpool, Lancashire, England, a British company
Filed Nov. 2, 1962, Ser. No. 234,942
Claims priority, application Great Britain Nov. 3, 1961
12 Claims. (Cl. 43—43.13)

The present invention concerns improvements in or relating to fishing tackle and is especially concerned with tackle which is used in the type of angling known in the art as "spinning." More particularly this invention relates to a protective cover or cover guard for a swivel or swivels, customarily incorporated in spinning tackle.

In the above mentioned form of angling, spinners or spoons are employed by anglers as artificial lures. These lures are usually made of a metallic and/or plastic material with at least one hook attached thereto and when such a lure is drawn through water, it has a spinning, wobbling motion associated therewith. This motion is such as to make the lure attractive to predatory fresh or salt water fish, such as pike, perch, salmon, trout and bass.

Due to the spinning motion of the lure, a swivel is usually fastened between the lure and the end of the fishing line, remote from the reel, in order to prevent twisting of the line and the subsequent formation of a "bird's nest" tangle. The arrangement of tackle commonly used comprises a length of nylon or fine wire, two to three feet long, having a swivel attached at each end thereof, and sometimes referred to as "a trace," one of said swivels being connected to the fishing line and the other to the lure.

By means of swivels, tangles can be effectively prevented in spinning, especially in clear waters but the disadvantage has arisen in that when spinners are used in waters having an abundant growth of weed, the swivels become fouled with strands of weed. It has been found in practice that the swivel remote from the lure is the more effective in the prevention of tangles and it is this swivel which tends to accumulate weed when drawn through a weed bed to such an extent that its swivel mechanism locks and hence does not fulfill its purpose.

The present invention seeks to provide a protective cover guard for a swivel whereby the swivel is protected from the weed and is free to operate normally.

According to the present invention, a protective cover guard for a swivel comprises a tubular member having a portion tapered towards one end thereof, a bore extending inwardly from the other end of the member and terminating in a constriction at said one end, said bore being adapted to receive a swivel for rotation therein and said constriction having means adapted to restrain the leading end ring of the swivel against rotation relatively thereto and to allow the passage of a fishing line therethrough.

In order to prevent the cover guard from becoming detached from its associated swivel when the lure is being cast into the waters being fished, the bore of the cover guard can be provided with resiliently deformable retaining means adapted to retain the swivel therein. The retaining means within the bore may conveniently comprise an inwardly projecting rib or a portion of reduced diameter bore which is preferably positioned at the mouth of the tapered end portion of the bore, such that on the swivel being inserted into the cover guard the leading end ring is forced past the rib or the reduced diameter bore portion whereby the end ring, and hence the swivel, can be retained within the guard.

The constriction can be formed by the bore having a tapered end portion at said one end of the tubular member which connects with a smaller co-axial bore, the smaller bore in turn having a tapering portion which connects with a yet smaller bore which opens at said one end of the member. Preferably, however, the constriction is formed by the bore having a tapering end portion at said one end of the member which communicates directly with a smaller co-axial bore opening at said one end of the member.

The means by which the constriction is adapted to restrain the leading end ring of the swivel can comprise at least one diametral groove (but preferably two diametral grooves which are angularly substantially at right angles to each another) in to which part of said ring is introduced to be held therein by a wedging action, such that this ring remains stationary relatively to the cover guard while the remainder of the swivel is free to rotate. Alternatively, a pair of longitudinal inwardly projecting ribs diametrically spaced apart can be provided within the constriction and which are adapted to restrain the leading end ring of the swivel against rotation relatively to the cover guard.

The cover guard of the present invention can also have at least one fin on the outer surface thereof which preferably follows the angle of the tapered end portion of the tubular member and then continues to the other end of the member. In practice the fin (or fins) helps to prevent rotation of the cover guard as it travels through water.

The invention will be further described by way of example with reference to the accompanying drawings, in which:

FIG. 5 is a sectional elevation of yet another embodiment of a cover guard according to the present invention;

FIG. 6 is a section taken along the line II—II of FIG. 5, and

FIG. 7 is a further embodiment of a cover guard.

Figure 1:
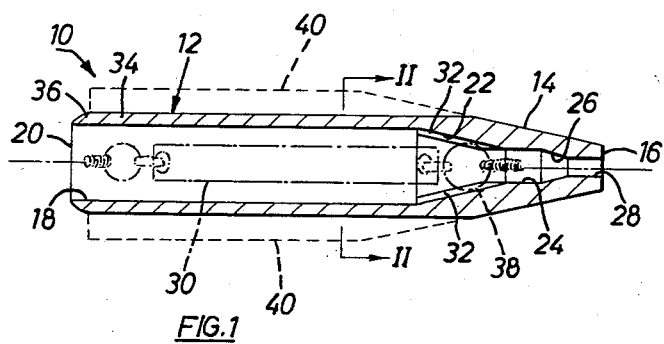
FIG. 1 is a sectional elevation of one embodiment of a cover guard according to the present invention.
Figure 2:
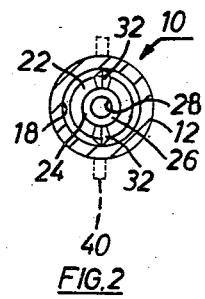
FIG. 2 is a section taken along the line II—II of FIG. 1.

Referring firstly to FIGS. 1 and 2, one embodiment of a protective cover guard for a swivel, generally designated at 10, comprises a tubular member 12 having a portion 14 tapered towards the end 16 thereof. A bore 18 extends inwardly from the end 20 of the member 12 and terminates in a constriction which is formed by a tapered bore 22 connecting with a bore 24, having a tapered continuation 26, and a smaller bore 28 opening at the end 16.

Figure 4:
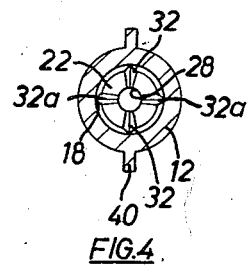
FIG. 4 is a section taken along the line III—III of FIG. 3.

The tapered continuation 22 of the bore 18 has at least one longitudinal and diametral groove 32 formed in the wall thereof, but preferably two such grooves are formed which are angularly substantially at right angles to one another as illustrated at 32 and 32a in FIG. 4. The wall 34 of the member 12 is preferably chamfered as at 36 at the end 20, the purpose of which will be hereinafter described. The cover guard 10 is utilized as follows:

A trace comprising a length of, for example, nylon fishing line, has a spinner swivelably attached at one end thereof and has a swivel 30 (shown in FIG. 1) attached at the other end thereof. The free end of a fishing line is threaded into the bore 28 of the cover guard and through the member 12. This free end of the line is then attached to the leading end ring 38 of the swivel 30 and then the cover guard is pushed over the swivel so that the swivel is entirely enclosed therein. The cover guard and swivel are adjusted in order that the leading end ring 38 mates with the grooves 32 in the tapered bore 22 to be rigidly held therein against rotation. Although the ring 38 is now held stationary the remainder of the swivel is free to rotate in the bore 18. The knot formed during the attachment of the fishing line to the swivel 30 is conveniently housed within the bore 24.

The bore 16 of the cover guard 10 is dimensioned such that when the guard is drawn through water the bore allows water to pass therethrough and through the member 12, but is small enough to prevent weeds entering therein. If water is restricted by the bore 28 from passing through the guard 10 there is a tendency for a partial vacuum to exist within the interior of the guard which is sufficient to draw small pieces of weed therein, when, for example, the guard is being drawn through a weed bed. This vacuum can be removed by having a series of small diameter holes in the wall 34 of the member 12 forming pressure equalizers but preferably the above-mentioned remedy is the more desirable. The end portion 36 of the wall 34 may be chamfered with a view to producing a slipstream as the guard is drawn through the water. Any tendency of the guard 10 to rotate can be substantially overcome by a fin 40 or a pair of fins (shown in dotted outline in FIG. 1), diametrically spaced apart on the outer surface of the member 12 acting to stabilize the guard 10.

Figure 3:
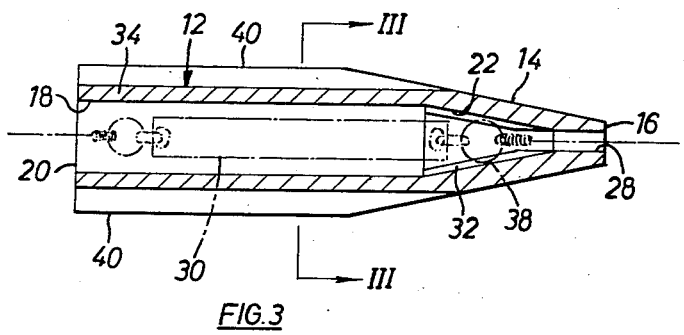
FIG. 3 is a sectional elevation of another embodiment of a cover guard according to the present invention.

FIGS. 3 and 4 illustrate another embodiment of the cover guard, according to the present invention, which is of a somewhat simplified version of the embodiment of FIGS. 1 and 2.

The cover guard of this embodiment has essentially the same structural features as the embodiment of FIGS. 1 and 2, like features having the same reference numerals, but for the following exceptions:

The longitudinal bore 18 of the member 12 terminates in a tapered bore 22 which connects directly with the bore 28. Two grooves 32, 32a are formed in the wall of the bore 22.

Two shallow diametrically spaced fins 40 are integrally formed with the member 12 of the guard on the outer surface of the wall 34. The outer edge of each fin merges smoothly into the tapered portion 14 and then runs parallel with the surface 34 to the end 20 of the guard where the ends of the fins 40 are cut flush with said end.

Referring to FIGS. 5 and 6 of the drawings, in yet another embodiment a protective cover guard for a swivel, generally designated at 10, comprises a tubular member 12 having a portion 14 tapered towards the end 16 thereof. A bore 18 extends inwardly from the end 20 of the member 12 and terminates in a constriction formed by a tapered portion 22 of the bore 18 connecting with a smaller bore 24 opening at the end 16.

The tapered continuation 22 of the bore 18 has a pair of diametrically spaced apart ribs 26 projecting inwardly from the wall thereof, and an annular lip or a portion of reduced diameter bore 28 is formed integrally with the wall of the bore 18 at the mouth of the tapered portion 22 remote from the end 16 of the cover guard.

The swivel 30 can be retained within the guard 10 by means of the annular lip or portion 28 through which the leading end ring of swivel is forced after insertion into the bore 18, into the tapered bore portion 22. This being achieved owing to the fact that the lip 28 is sufficiently resilient to allow the passage of the end ring therethrough, i.e., the end ring is snapped past the lip which then retains it within the bore portion 22.

It will be obvious that the cover guard must be used with the appropriate size of swivel, i.e., a swivel which incorporates end rings having a transverse dimension slightly greater than the internal diameter of the annular lip or reduced diameter bore portion.

The cover guard and swivel are adjusted in order that the end ring abuts against the ribs 26 whereby rotation of the end ring relatively to the cover guard is restrained.

Any tendency of the guard 10 to rotate when in use can be at least reduced by the provision of a single fin 40, or a pair of fins diametrically spaced apart on the outer surface of the member 12, acting to stabilize the guard on its movement through water.

The following details are typical of the construction of a swivel cover guard according to the embodiments illustrated in the drawings. The cover guard may be made from any suitable thermo-setting or thermo-plastic plastic or even from metal. Suitable plastic materials include, for example, nylon, polyvinyl chloride, polyethylene and polystyrene. It is preferable that the material used should exhibit some degree of resilience with a resistance to impacts. Although the material can be transparent, it is not desirable since, for example any sunlight falling thereon would be scattered, thus making the guard visible in the water. Thus it is better if the material is opaque and preferably of the same colour as the fishing lines in common usage. Unless it is required that the guard should act also as a weight, it is desirable that the material is not of too great a density.

A swivel guard may be dimensioned such that it will accommodate and protect the largest to the smallest swivel normally used in the spinning art. For example a guard having a tapered portion 14 of length 3/8 inch, and the remainder of the member 12 having a length of 1 inch (i.e., the overall length of the guard being 1 3/8 inches) with a bore 10 of diameter 3/16 inch, will accommodate swivels having dimensions of length 13/16 inch and width 5/32 inch to length 5/16 inch and width 3/32 inch; such swivels being commonly used in angling. It will be understood, however, that swivel guards can be made in varying sizes such that one guard will only accommodate a particular size of swivel.

However, in order that a swivel guard may accommodate a swivel smaller than the particular size of swivel intended therefore, a further resiliently deformable rib or reduced diameter bore portion 28a can be provided within the tapered end portion of the bore, as illustrated in FIG. 7.

In the embodiments illustrated in FIGS. 1 to 7 the tapered portion 14 can have any angle of taper less than 180°, but it is preferable to have a small angle in order to reduce resistance on movement of the guard through water. Too small an angle results in the end 16 of the guard being pointed and, hence, fragile. A convenient angle has been found to be 30°. Conveniently the bore 22 has an angle of 30° since this size of angle facilitates the accommodation of a wide range of varying sizes of swivel rings. However, these angles are only examples to which the scope of the invention is not limited.

Additional fins or pairs of fins 40 may be provided, if desired.

The swivel guard has the advantages in that it is relatively cheap to manufacture and provides an effective and simple remedy whereby a swivel is protected. Another advantage lies in the fact that the probability of a tangle occurring in the fishing line is greatly reduced.

I claim:

1. A protective cover guard for a swivel having a body and an end ring rotatably attached thereto at each end thereof and adapted for connection to a fishing line, comprising a cylindrical member, a portion of said member tapering towards one end thereof, said member having a longitudinally extending bore therein, said bore being adapted to receive a said swivel for rotation therein, a constriction in said bore at said one end of said member, at least one diametral groove formed within said constriction adapted to receive and hold by a wedging action the leading end ring of a said swivel when inserted therein to restrain the end ring against rotation relatively thereto, said constriction also allowing the passage of a fishing line therethrough.

2. A protective cover guard as set forth in claim 1 wherein two diametral grooves arranged angularly substantially at right angles to each other within said constriction are adapted to restrain the leading end ring of a said swivel against rotation relatively thereto.

3. A protective cover guard as set forth in claim 1 wherein said tubular member is provided with at least one fin on the outer surface thereof.

4. A protective cover guard for a swivel having a body and an end ring rotatably connected thereto at each end thereof and adapted for connection to a fishing line, comprising a tubular member, a portion of said member tapering inwardly towards one end thereof, said member having a bore extending inwardly from the other end thereof, a constriction terminating said bore at said one end of said member, said bore being adapted to receive a said swivel therein, resiliently deformable retaining means within said bore adapted to retain a said swivel therein, and means within said constriction adapted to restrain the leading end ring of a said swivel against rotation relatively thereto, and to allow the passage of a fishing line therethrough.

5. A protective cover guard for a swivel having a body and an end ring rotatably connected thereto at each end thereof and adapted for connection to a fishing line, comprising a tubular member, a portion of said member tapering towards one end thereof, said member having a longitudinal bore adapted to receive a said swivel for rotation therein, said bore terminating in a tapered portion in the region of said one end of said member, said tapered portion of said bore connecting with a smaller co-axial bore opening at said one end of said member, said coaxial bore being adapted to allow the passage of a fishing line therethrough, at least one resiliently deformable inwardly projecting rib in said bore disposed at the mouth of said tapered portion of said bore such that on a said swivel being inserted into said bore the leading end ring thereof is forced past the rib whereby a said swivel is retained within said bore, and means within said tapered portion of said bore for restraining rotation of the leading end ring of a said swivel relatively thereto.

6. A protective cover guard as set forth in claim 5 wherein two resiliently deformable inwardly projecting ribs axially spaced apart are provided within said bore.

7. A protective cover guard for a swivel comprising a cylindrical member having a portion tapered towards one end thereof, said member having a bore extending inwardly longitudinally from the other end thereof, said bore terminating in a tapered portion near said one end of said member, said tapered bore portion of said bore communicating with a smaller co-axial bore opening at said one end of said member which is adapted to allow the passage of a fishing line therethrough, said bore being adapted to receive a said swivel having a leading end ring to which said line is attachable, a resiliently deformable portion of reduced diameter bore positioned at the termination of said bore near said one end of said member adapted to restrain a said swivel in said bore, and a pair of longitudinal inwardly projecting ribs diametrically spaced apart in said tapered bore portion, said ribs being adapted to restrain rotation of the leading end ring of a said swivel relatively to the cover guard.

8. A protective cover guard as set forth in claim 6 wherein at least one fin is provided on the outer surface of said cylindrical member.

9. A protective cover guard for a swivel having a body and an end ring rotatably connected thereto at each end thereof and adapted for connection to a fishing line comprising a tubular member made of a synthetic plastic material, a portion of said member being tapered towards one end thereof, said member having an axial bore extending longitudinally of said member adapted to receive a said swivel for rotation therein, a constriction at said one end of said member terminating said bore, a portion of said constriction opening at said one end of said member and adapted to allow the passage of a length of fishing line from the exterior to the interior of said member, resiliently deformable means within said bore adapted to hold a said swivel therein, means formed within said constriction for restraining the leading end ring of a said swivel against rotation relatively thereto, and two shallow diametrically spaced apart fins radially extending from the outer surface of said member and integrally connected thereto, each of said fins having a portion which follows the angle of said tapered portion of said member and then continues to the other end of said member.

10. A protective cover guard as set forth in claim 6 wherein said synthetic plastic material is opaque and exhibits some degree of resilience.

11. A protective cover guard for a swivel having a body and an end ring rotatably connected at each end thereof adapted for connection to a fishing line, comprising a tubular member, a portion of said member tapering towards one end thereof, said member having a bore extending inwardly from the other end thereof, said bore being adapted to receive a said swivel for rotation therein, a constriction terminating said bore at said one end of said member, and means within said constriction for restraining the leading end ring of a said swivel when inserted therein against rotation relatively thereto and to allow the passage of a fishing line therethrough, said constriction being formed by said bore having a tapered end portion at said one end of said member, a smaller coaxial bore connecting with said tapered portion of said bore and having a tapered portion connecting with a further smaller bore which opens at said one end of said member.

12. A protective cover guard for a swivel having a body and an end ring rotatably attached thereto at each end thereof and adapted for connection to a fishing line, comprising a tubular member, a portion of said member tapering towards one end thereof, said member having a bore extending inwardly from the other end thereof, said bore being adapted to receive a said swivel for rotation therein, a constriction terminating said bore at said one end of said member, and means within said constriction for restraining the leading end ring of a said swivel when inserted therein against rotation relatively thereto and to allow the passage of a fishing line therethrough, said constriction being formed by said bore having a tapered end portion at said one end of said member which connects with a smaller coaxial bore opening at said one end of said member.

References Cited in the file of this patent

UNITED STATES PATENTS

| 798,575 | Eastman | Aug. 29, 1905 |
| 1,222,774 | Leonard | Apr. 17, 1917 |
| 2,886,915 | MacDonald | May 19, 1959 |